US012668226B2

(12) United States Patent
Beauvais et al.

(10) Patent No.: US 12,668,226 B2
(45) Date of Patent: Jun. 30, 2026

(54) SYSTEM AND METHOD FOR INFERRING VEHICLE STATE BASED ON SUPPLY VOLTAGE CHANGES

(71) Applicant: FORD GLOBAL TECHNOLOGIES, LLC, Dearborn, MI (US)

(72) Inventors: Brandon Beauvais, Dearborn, MI (US); Andrew Stoscup, Wixom, MI (US); Daniel A. Gabor, Canton, MI (US); Charles Everett Badger, II, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 526 days.

(21) Appl. No.: 18/108,882

(22) Filed: Feb. 13, 2023

(65) Prior Publication Data

US 2024/0270224 A1      Aug. 15, 2024

(51) Int. Cl.
    *B60T 17/22*     (2006.01)
    *B60L 7/00*     (2006.01)

(52) U.S. Cl.
    CPC ................ *B60T 17/22* (2013.01); *B60L 7/00* (2013.01); *B60L 2240/12* (2013.01); *B60L 2240/547* (2013.01); *B60T 2250/04* (2013.01)

(58) Field of Classification Search
None
See application file for complete search history.

(56) References Cited

U.S. PATENT DOCUMENTS

| | | |
|---|---|---|
| 6,345,225 B1 | 2/2002 | Böhm et al. |
| 10,023,170 B2 | 7/2018 | Mannherz et al. |
| 11,447,111 B2 | 9/2022 | Rebholz-Goldmann et al. |
| 2008/0135357 A1 | 6/2008 | Lang |
| 2010/0299035 A1* | 11/2010 | Maron ................... B60T 13/746 |
| | | 188/106 P |
| 2017/0200329 A1* | 7/2017 | Rajakondala ........... G01S 19/52 |
| 2018/0037208 A1 | 2/2018 | Englert et al. |
| 2019/0375283 A1 | 12/2019 | Philipp |

FOREIGN PATENT DOCUMENTS

| | | |
|---|---|---|
| EP | 1106466 A1 | 6/2001 |
| GB | 2457162 A | 8/2009 |
| KR | 102409071 B1 | 6/2022 |

* cited by examiner

*Primary Examiner* — Navid Z. Mehdizadeh
*Assistant Examiner* — Jason R Roberson
(74) *Attorney, Agent, or Firm* — Burr & Forman; Lorne Forsythe

(57) ABSTRACT

In a method of inferring a vehicle state for control of a vehicle component based on the vehicle state inference, the vehicle may include a first electromechanical brake module operably coupled to first wheel-end brakes of a first wheel and a second electromechanical brake module operably coupled to second wheel-end brakes of a second wheel. The method may include receiving an indication of vehicle speed, receiving an indication of vehicle voltage supply to determine whether an event trigger transition is detected based on a change in the vehicle voltage supply, determining a communication state of at least one of the first and second electromechanical brake modules responsive to the event trigger transition being detected, where the communication state is one of a connected state or a disconnected state, and initiating a state inference operation based on the indication of vehicle speed and detection of the event trigger transition.

18 Claims, 4 Drawing Sheets

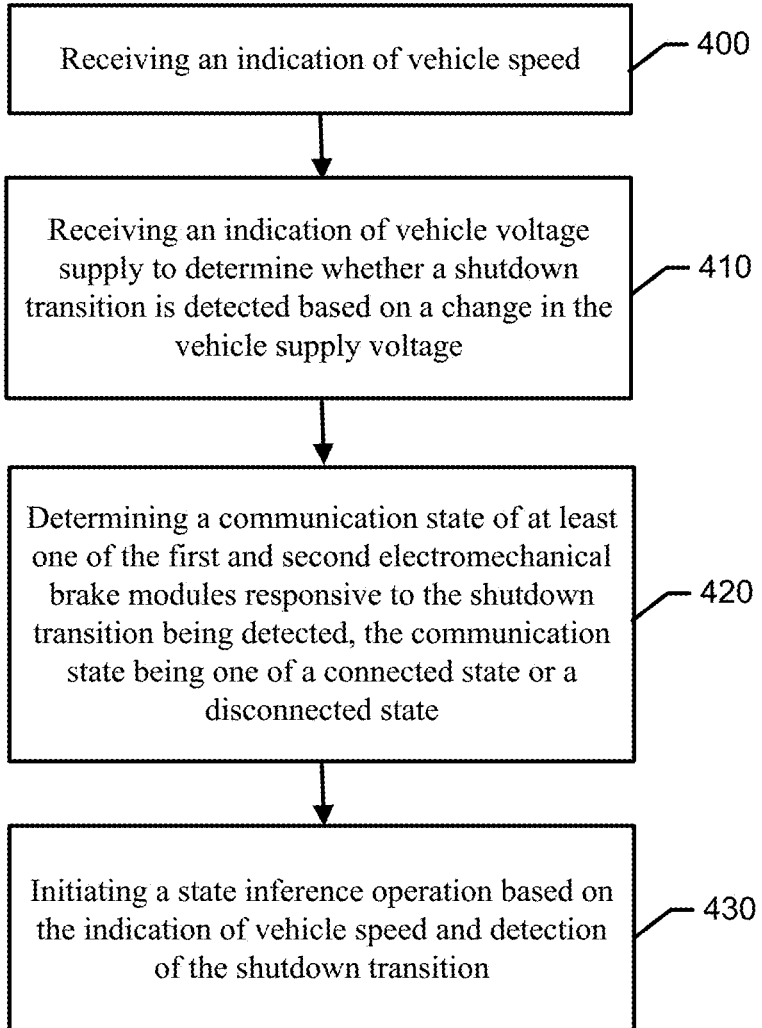

Receiving an indication of vehicle speed ⟋— 400

Receiving an indication of vehicle voltage supply to determine whether a shutdown transition is detected based on a change in the vehicle supply voltage ⟋— 410

Determining a communication state of at least one of the first and second electromechanical brake modules responsive to the shutdown transition being detected, the communication state being one of a connected state or a disconnected state ⟋— 420

Initiating a state inference operation based on the indication of vehicle speed and detection of the shutdown transition ⟋— 430

FIG. 4

SYSTEM AND METHOD FOR INFERRING VEHICLE STATE BASED ON SUPPLY VOLTAGE CHANGES

TECHNICAL FIELD

Example embodiments generally relate to vehicle control algorithms and, more particularly, relate to a system and method for providing an ability to infer a vehicle state based on system voltage.

BACKGROUND

In today's electric vehicles (EVs), and even in some internal combustion engine (ICE) vehicles, both the brake system and the power steering system use electrical energy to provide corresponding services to the driver. The use of electrical component control can reduce the reliance on mechanical or hydraulic systems to provide physical communication between various components in these systems. In doing so, much weight and complexity in vehicle design may be reduced, but a reliance on good electrical communication is correspondingly increased. Meanwhile, the electrical energy used by these systems may be provided by a single or common power supply. During certain situations, these systems may encounter transient conditions that can be indicative of vehicle state. Given the ability to monitor these conditions, example embodiments may attempt to infer vehicle status accordingly, and make use of such inferences to bolster reliable component control even if normal electrical communication between components is interrupted.

BRIEF SUMMARY OF SOME EXAMPLES

In accordance with an example embodiment, a vehicle control system for a vehicle may be provided. The system may include a first electromechanical brake module operably coupled to first wheel-end brakes of a first wheel, a second electromechanical brake module operably coupled to second wheel-end brakes of a second wheel, a speed sensor for determining vehicle speed, and a communication monitoring module operably coupled to at least one of the first and second electromechanical brake modules to determine a communication state of the at least one of the first and second electromechanical brake modules. The communication state may be one of a connected state or a disconnected state. The communication monitoring module may also be operably coupled to the speed sensor. The communication monitoring module may receive an indication of vehicle voltage supply to determine whether an event trigger transition is detected, and initiate a state inference operation based on the vehicle speed and responsive to detecting the event trigger transition.

In another example embodiment, a method of inferring a vehicle state for control of a vehicle component based on the vehicle state inference may be provided. The vehicle may include a first electromechanical brake module operably coupled to first wheel-end brakes of a first wheel and a second electromechanical brake module operably coupled to second wheel-end brakes of a second wheel. The method may include receiving an indication of vehicle speed, receiving an indication of vehicle voltage supply to determine whether an event trigger transition is detected based on a change in the vehicle voltage supply, determining a communication state of at least one of the first and second electromechanical brake modules responsive to the event trigger transition being detected, where the communication state is one of a connected state or a disconnected state, and initiating a state inference operation based on the indication of vehicle speed and detection of the event trigger transition.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 illustrates a block diagram showing a method of inferring a vehicle state for control of a vehicle component based on the vehicle state inference in accordance with an example embodiment.

DETAILED DESCRIPTION

Figure 1:
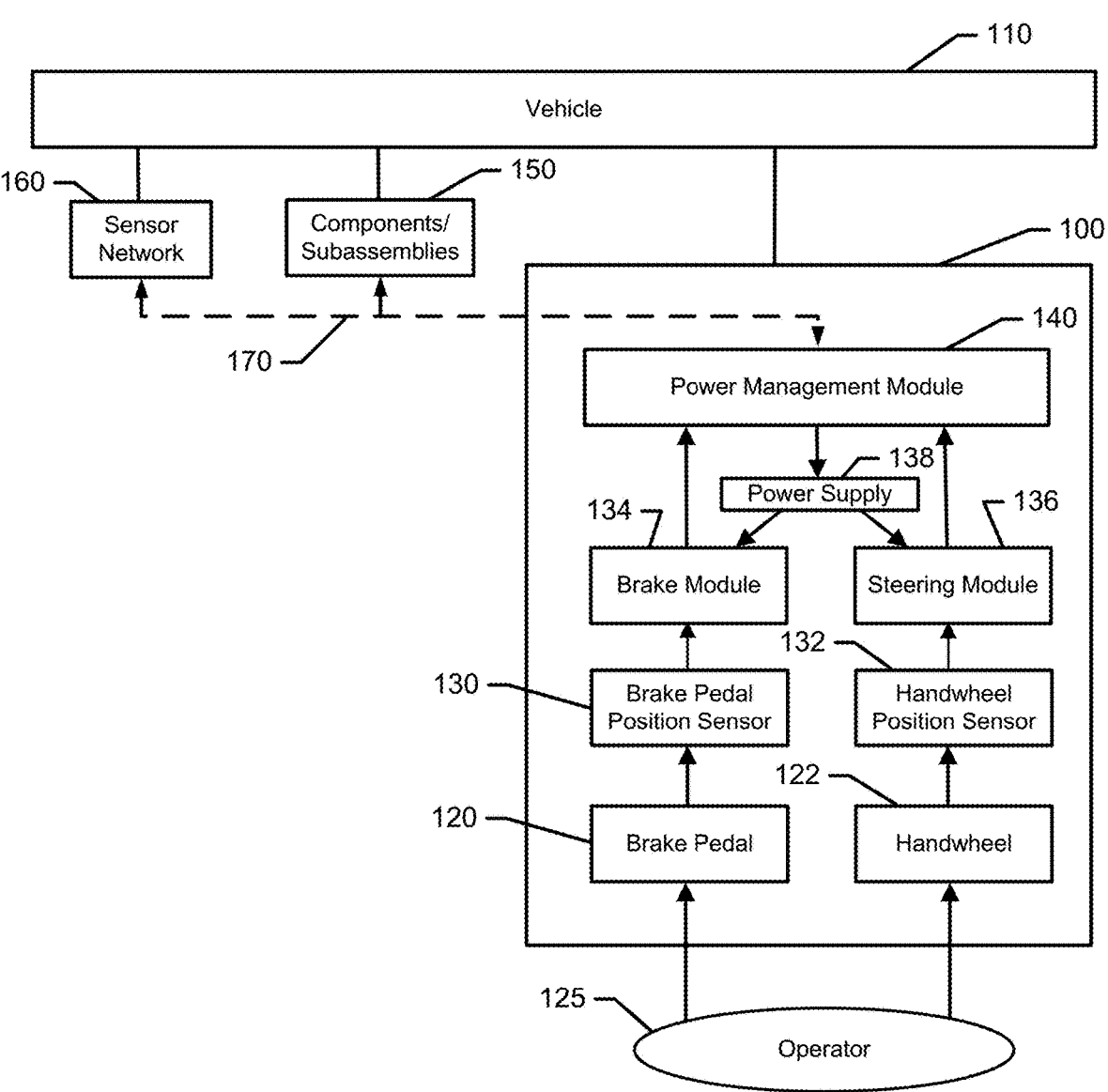
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

FIG. 1 illustrates a block diagram of a vehicle control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include one or more input devices in the form of one or more control pedals, wheels, buttons, levers, etc. In some embodiments, the control pedals may include a foot-operated brake pedal 120. However, the control pedals could alternatively be hand operated or any other operable member via which an operator 125 may provide an input indicative of an intent of the operator 125 relative to controlling the provision of braking torque for application to the wheels of the vehicle 110. Another example input device may include a steering wheel (or handwheel 122). The handwheel 122 may be rotatable by the operator 125 to provide an input indicative of an intent of the operator 125 relative to controlling a direction of travel of the vehicle 110, typically through control of the turning of the front wheels of the vehicle 110.

The control system 100 may also include position sensors for each of the brake pedal 120 (which may have a corresponding brake pedal position sensor 130) and the handwheel 122 (which may have a corresponding handwheel position (or angle) sensor 132). The brake pedal position sensor 130 and the handwheel position sensor 132 may provide data indicative of the precise position of the brake pedal 120 and the handwheel 122 to a brake module 134 and a steering module 136, respectively. Although not shown in FIG. 1, the control system 100 may also have control pedals or other input devices for propulsion, and corresponding sensors propulsive torque modules, electric or gas powered motors, etc.

The brake module 134 may include electromechanical brakes (EMB) that may be disposed at respective wheel-ends, and that may be controlled by respective EMB modules. In some embodiments, the EMB modules may provide inputs to braking components or other components capable of providing a negative torque when actuated in order to slow, stop and/or hold the vehicle 110. In this regard, the EMB modules may be configured to increase the braking force on the braking components at the wheel-ends responsive to corresponding increases in the actuation force from a driver's foot on the brake pedal 120. Thus, the EMB modules (and thereby also the brake module 134) may be involved in determining a driver's braking demand and adjusting the braking force accordingly. The brake module 134 draws electrical power for executing its corresponding functions from a power supply 138.

The steering module 136 may include power steering, steer-by-wire or other electronically controlled or enhanced functions that translate movement of the handwheel 122 to corresponding turning of the front wheels (or other steering input wheels) of the vehicle 110. The steering module 136 also draws electrical power for executing its corresponding functions from the power supply 138. Thus, both the brake module 134 and the steering module 136 draw power from a common source, namely the power supply 138. The power supply 138 may be a battery or bank of battery cells, or an internal combustion engine (ICE) that generates rotary power that is converted into electrical power that, after such conversion, acts as the power supply 138. In an example embodiment, however, the power supply 138 may be a battery or alternator/DCDC converter having a voltage that transitions between a higher output voltage (e.g., of about 14V) to a resultant battery voltage that exists when shutdown (e.g., about 12V). In some cases therefore, measuring a voltage of the power supply 138 may allow an inference to be made regarding the state of the vehicle 110 (e.g., shutdown or not shutdown), where the vehicle 110 is, for example, assumed or inferred to be shutdown only when the transition from a higher output voltage of about 14V has been seen to be lowered down to a resultant voltage of about 12V that is correlated to the shutdown condition or state.

Given that the brake module 134 and the steering module 136 may each be understood to have respective peak periods of activity, and therefore also corresponding peak periods of power draw from the power supply 138, it may be desirable to manage the power draw to ensure that the power draw is maintained below the maximum capacity of the power supply 138, or otherwise control power draw from the power supply 138. Moreover, to the extent the power supply 138 may have different maximum capacity ratings for corresponding different driving conditions or modes of operation, it may also be desirable that the power draw be intelligently managed in consideration of the potential for different capacity limitations on the power supply 138 at different times, or in different modes of operation. To accomplish such intelligent management, example embodiments may employ a power management module 140. The power management module 140 may be configured to determine individual requests or requirements for power by the brake module 134 and the steering module 136, and then manage the provision of power from the power supply 138 to the brake module 134 and the steering module 136 as described herein based on inputs from the brake module 134, the steering module 136, and/or other components of the vehicle 110. In some cases, the control system 100 may be configured to perform other tasks related or not related to steering and braking control, propulsive control or performance management. However, those tasks are largely outside the scope of this disclosure and therefore will not be described in detail herein.

The power management module 140 may also, or alternatively, perform a monitoring function to enable the supplied or output voltage of the power supply 138 to be tracked and/or recorded over time. The power management module 140 itself may perform this monitoring function (e.g., via measuring output voltage, or a bus voltage), or may employ a sub-module to do so. A state inference based on the voltage may then be made as mentioned above. An example of such a sub-module will be described in greater detail in reference to FIG. 2 below.

In an example embodiment, the control system 100 may receive information that is used to determine vehicle status from various components or subassemblies 150 of the vehicle 110. The components or subassemblies 150 may include the brake pedal 120, the handwheel 122 and any number of other components. Additionally or alternatively, various sensors that may be operably coupled to the components or subassemblies 150 may be included, and may provide input to the control system 100 that is used in determining vehicle status. Such sensors may be part of a sensor network 160 and sensors of the sensor network 160 may be operably coupled to the control system 100 (and/or the components or subassemblies 150) via a vehicle communication bus (e.g., a controller area network (CAN) bus) 170. The sensors may include the brake pedal position sensor 130, the handwheel position sensor 132, and any number of other sensors. In some cases, the sensors may include current and/or voltage sensors that are operably coupled to the brake module 134 and/or the steering module 136 to detect the amount of current or voltage drawn by the brake module 134 and/or the steering module 136, respectively.

The components or subassemblies 150 may include, for example, a braking system, a propulsion system, a steering system, and/or a wheel assembly of the vehicle 110. The braking system may be configured to provide braking inputs to braking components of the vehicle 110 (e.g., electromechanical brakes, hydraulic brakes, regenerative brakes, etc.) based on a braking torque determined by the brake module 134. The braking system may also include more than one type of braking hardware. However, in an example embodiment, the braking system of the vehicle 110 may include electro-mechanical brakes (EMB), as noted above. The propulsion system may include a gas engine, electric motor, or any other suitable propulsion device. In some cases, the propulsion system may also incorporate drive-by-wire components and a corresponding control paradigm. The steering system may include the handwheel 122 and the steering module 136 described above.

Thus, many of the signals provided to the power management module 140 may be provided via the vehicle communication bus 170 (or CAN bus), including those associated with the brake module 134 and/or the steering module 136. By monitoring the CAN bus, the power management module 140 may determine either or both of the power demands being requested by the brake module 134 and the steering module 136. Moreover, one or more corresponding sensors of the sensor network 160 that may be operably coupled to other modules of the vehicle 110 may also provide power input information to the power management module 140 for consideration and control thereby.

Accordingly, for example, the control system 100 may be able to receive numerous different parameters, indications and other information that may be related to or indicative of different situations or conditions associated with vehicle status. The control system 100 may also receive information indicative of the intent of the operator 125 relative to control of various aspects of operation of the vehicle 110 and then be configured to use the information received to provide information to the power management module 140 in order to control application of power from the power supply 138 of the vehicle 110. The control system 100 of FIG. 1 may be similar to conventional systems in many respects, except that, the control system 100 (and in some cases specifically the power management module 140) may be modified to respond to situations in which the power demands made upon the power supply 138 may be deemed excessive as described in greater detail in reference to FIGS. 2-4 below.

Figure 2:
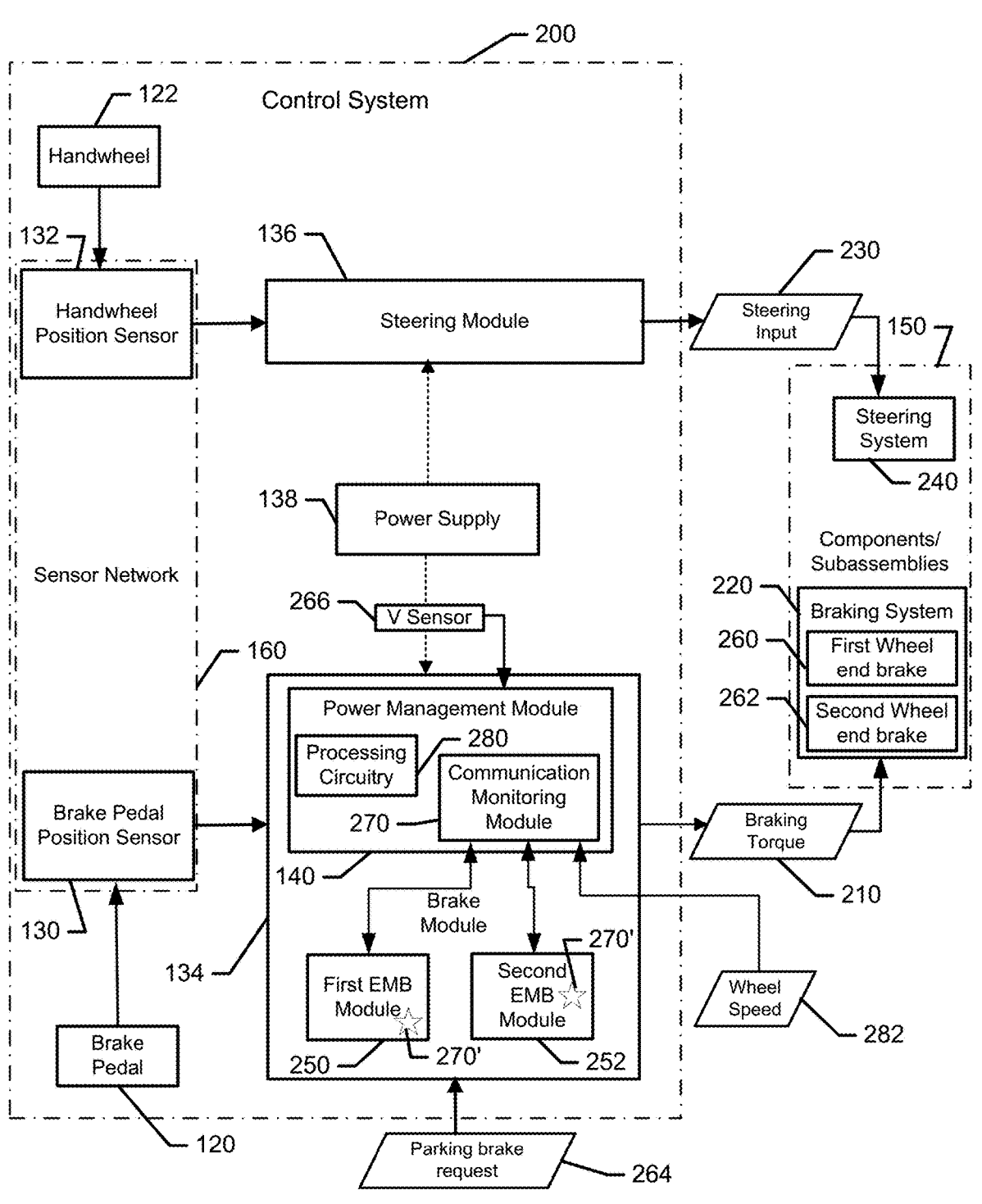
FIG. 2 illustrates a block diagram of some components of the vehicle control system of FIG. 1 in accordance with an example embodiment.

FIG. 2 illustrates a block diagram of various components of a control system 200 (which is a specific example of control system 100 of FIG. 1) in greater detail. In this regard, for example, FIG. 2 illustrates various ones of the components of FIG. 1 in a particular arrangement in which the power management module 140 is located at (or a submodule of) the brake module 134. Thus, whereas FIG. 1 illustrates a more general case in which the power management module 140 may be located anywhere in the control system 100, the example of FIG. 2 provides one nonlimiting and more detailed case in which the brake module 134 effectively becomes the arbitration agent for power management decisions that involve the brake module 134 and the steering module 136.

As shown in FIG. 2, the control system 200 may include the brake pedal 120, which may have the corresponding brake pedal position sensor 130, and the handwheel 122, which may have the associated handwheel position sensor 132. The power supply 138 may provide power to the brake module 134 and the steering module 136. Under normal driving conditions, inputs from the operator 125 may be provided at the brake pedal 120 and handwheel 122, and inputs from the respective sensors (e.g., the brake pedal position sensor 130 and the handwheel position sensor 132) may be provided to the brake module 134 and the steering module 136, respectively. The brake module 134 may then translate inputs received from the sensor network 160 into a braking torque request 210 that may be communicated to a braking system 220. Similarly, the steering module 136, which may be or include a power steering control module (PSCM), may then translate inputs received from the sensor network into a steering input request 230 that may be communicated to a steering system 240. The steering system 240 and the braking system 220 may include any of the components mentioned above in connection with describing such systems, along with other components that are outside the scope of this disclosure.

The brake module 134 may include a first EMB module 250 and a second EMB module 252, which may be operably coupled to the respective wheel-end brakes (e.g., first wheel-end brake 260 and second wheel-end brake 262) of the braking system 220. However, it should be appreciated that each of four wheels of the vehicle 110 may have its own respective wheel-end brakes, and corresponding EMB modules in some cases. Control signals for braking of the first wheel-end brake 260 may therefore normally come from the first EMB module 250, and the control signals for braking of the second wheel-end brake 262 may normally come from the second EMB module 252. In some embodiments, the control signals for braking may, as noted above, be proportional to operation of the brake pedal 120. However, in some cases, the first and second EMB modules 252 may also be used in connection with application of braking force for parking brake functionality. Thus, for example, the brake module 134 of some embodiments may also actuate or activate the first and second EMB modules 252 when a parking brake request 264 is received. In such embodiments, both of the first and second EMB modules 252 may be actuated or activated to provide additional braking force so that the vehicle 110 is held for the parking brake function to be effective.

In some vehicle designs, redundant or backup stopping (or holding) means may be provided in case of a fault with respect to operation of one or both of the first and second EMB modules 250 and 252. Thus, for example, if communication is lost with one of the EMB modules, although the other may continue to operate, it may still be desirable for the one that is out of communication to enter an actuated state in some cases. For example, if the vehicle 110 is stopped and the parking brake request 264 was received, while the first EMB module 250 was out of communication (e.g., with the CAN bus), it may be desirable for the first EMB module 250 to actuate even without the control signal to do so when it can be determined that vehicle speed is very low (e.g., near zero) and communication is lost. This is a conservative reaction to the loss of communication, which may not be employed if the vehicle 110 was otherwise moving since the second EMB module 252 may be able to operate to brake the vehicle 110 even if the first EMB module 250 is lost. However, for the low speed situation, the conservative assumption is to assume that the desired state is parked, and actuate the first EMB module 250 (i.e., the one out of communication). This fault mode response, while conservative, may prevent the vehicle 110 from being operated in case of a loss of communication to one of the EMB modules, since the lost EMB module may effectively lock up.

During the operations described above, the power supply 138 may fully supply the power requirements of each of the steering module 136 and the brake module 134 under normal circumstances. Thus, the loading that is created by transient conditions associated with braking, steering and other functions will cause the output voltage of the power supply 138 to fluctuate. However, as noted above, there may be certain characteristic voltage levels or transitions that can be associated reliably with corresponding vehicle states. Configuration of the power management module 140 to be able to detect such conditions and thereby infer vehicle states, and to correspondingly control engagement of a parked state, or otherwise control the EMB modules based on the inferred vehicle state, may be a desirable modification that does not encounter EMB module lock up conditions described above.

While in operation to support generation of the steering input request 230 and/or the braking torque request 210, the steering module 136 and the brake module 134, respectively, each draws power from the power supply 138 that may be measured. As an example, one way to measure the power draw may be to include one or both of current and voltage sensors as part of the sensor network 160. As such, for example, a voltage sensor (e.g., V sensor 266) may be provided to measure the voltage output of the power supply 138. Real time, or near real time, measurements from the voltage sensor may therefore be communicated to the power management module 140.

More particularly, the voltage measurements may be provided to a communication monitoring module 270, which may be operably coupled to or even embodied in processing circuitry 280 (e.g., a processor and memory) of the power management module 140. The processing circuitry 280 may, for example, record voltage measurements from the voltage sensor over time in tabular format, or otherwise process or analyze such measurements based on an algorithm or other programmable instructions employed by or embodying the communication monitoring module 270. In an example embodiment, wheel speed 282 (or vehicle speed) information may be provided to the communication monitoring module 270 as well, in order to enable the communication monitoring module 270 to perform the state inference functions described herein. As used in herein, the term "module" is intended to include a computer-related entity, such as but not limited to hardware, firmware, or a combination of hardware and software (i.e., hardware being configured in a particular way by software being executed thereon). For example, a module may be, but is not limited to being, a process running on a processor, a processor (or processors), an object, an executable, a thread of execution, and/or a computer.

As noted above, in some cases, it may be desirable to provide control of EMB modules or wheel-end brakes themselves based on knowledge of the state of the vehicle 110. To accomplish this, introducing certain sensors and/or processing circuitry to evaluate conditions and take action when certain triggering conditions are detected may be a successful approach. However, direct implementation of such a strategy may result in an "always on" sensing paradigm that must be continuously in operation in order to be effective. This strategy, while certain perhaps to accomplish the end goal, may nevertheless do so with more complexity than is needed and, in any case, would result in a power hungry circuitry that unnecessarily operates and consumes power most of the time. Thus, a more clever and yet simpler approach may be preferable.

In this regard, in order to prevent an "always on" condition for the execution of a state inference algorithm or process, example embodiments may, in a relatively simple way, actually only turn on the processing capacity when conditions dictate a need to do so. Thus, given that output voltage of the power supply 138, as measured by the voltage sensor, may change in a characteristic way when certain state changes occur, such output voltage measurement may enable triggering the algorithm or further inference processing with simple components. For example, when the vehicle 110 is "key on" various low voltage network components may be supported by the power supply 138 and output voltage may have a first value (e.g., about 14V). When the vehicle 10 is "key off" and shut down, the output voltage of the power supply 138 may be measured at a second value (e.g., 12V), which may be lower than the first value by a difference threshold (e.g., about 2V). Accordingly, detecting the characteristic voltage transition may be used to make a state inference that may be useful in connection with various control functions.

However, detecting the voltage change, and particularly a voltage change of a specific and somewhat predictable amount, can be done with very uncomplicated circuitry that can be binary in operation (e.g., turning on only when a threshold voltage difference is detected), and further draw very little (and almost no) power when the trigger condition is not present. For example, a simple transistor circuit that is off before the 2V change is detected, and turns on thereafter, to correspondingly trigger operation of the state inference determination, may be employed.

Figure 3:
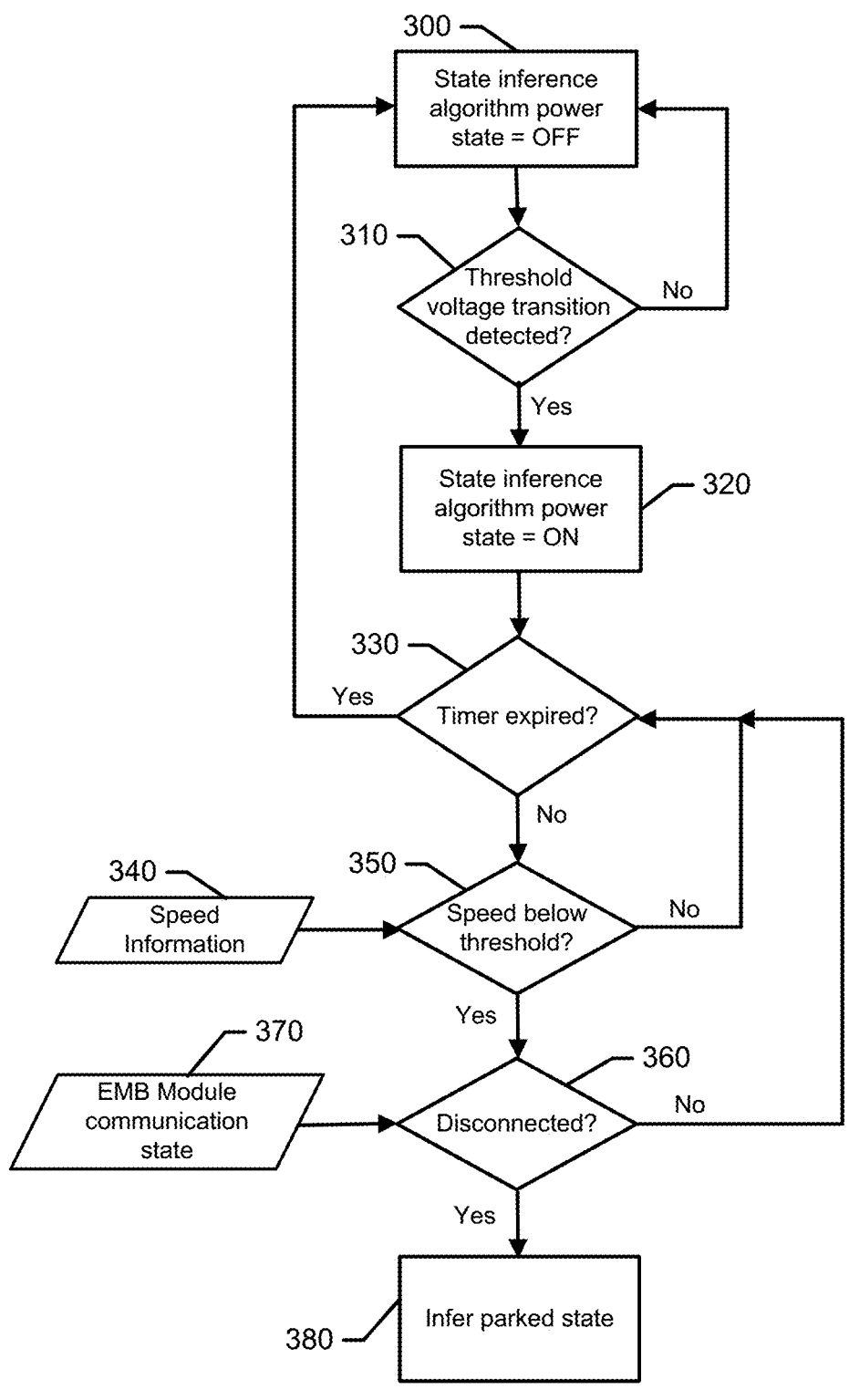
FIG. 3 illustrates a block diagram showing control flow associated with a triggering and executing a vehicle state inference algorithm in accordance with an example embodiment.

Once turned on, the state inference algorithm may operate and consume processing power, only over a limited time by virtue of the employment of a timer that expires a given time after the initial trigger is detected. FIG. 3 illustrates a block diagram showing control flow for how this may work. In this regard, as shown at operation 300, the processing circuitry associated with the state inference algorithm may initially be off, thereby defining the normal state for the system. If a threshold voltage change is detected, such transition may be experienced as a shutdown transition at operation 310, and the processing circuitry associated with the state inference algorithm may be turned on at operation 320. However, for as long as no shutdown transition is detected, the processing circuitry associated with the state inference algorithm will remain off.

After the shutdown transition is detected at operation 310, and the processing circuitry associated with the state inference algorithm is turned on at operation 320, a timer may be started. A determination may then be made at operation 330 as to whether the timer has expired. If expired, then flow may return to operation 300, and the processing circuitry associated with the state inference algorithm may again turn off to conserve overall power consumption. However, as long as the timer has not expired, flow may proceed to the state inference processing algorithm, which is effectively defined in accordance with one example in operations 340 to 380.

In this regard, speed information 340 may be considered to determine whether the speed information 340 (e.g., wheel speed or vehicle speed) is below a threshold speed (e.g., at or near zero) at operation 350. If speed is above the threshold speed, then flow may return to operation 330, thereby effectively only keeping the processing circuitry that performs the state inference algorithm powered on or active during the timer run after any shutdown transition is noticed. If the speed is below the threshold speed, then flow may continue to operation 360 where a determination is made as to whether any EMB module is in a disconnected state. EMB communication state information 370 may be provided to enable the determination at operation 360, and the EMB communication state information 360 may be obtained, for example, when one of the EMB modules is not responding to communications over the CAN bus. If no EMB module is in a disconnected state, flow may proceed to operation 330, as discussed above. If any module is in a disconnected state, the parking state may be inferred at operation 380.

Notably, the operations 350 and 360 may be reversed in order, or may be accomplished simultaneously. Moreover, in some cases, the voltage sensor that measures voltage changes to detect the shutdown transition may be filtered so that transient changes (e.g., due to steering when not moving or other such loads) may be filtered out.

As shown in FIG. 4, an method of inferring a vehicle state for control of a vehicle component based on the vehicle state inference may be provided. In the context of this method, the vehicle may be understood to include a first electromechanical brake module operably coupled to first wheel-end brakes of a first wheel and a second electromechanical brake module operably coupled to second wheel-end brakes of a second wheel. The method may include receiving an indication of vehicle speed at operation 400 and receiving an indication of vehicle voltage supply to determine whether a shutdown transition is detected based on a change in the vehicle voltage supply at operation 410. The method may further include determining a communication state of at least one of the first and second electromechanical brake modules responsive to the shutdown transition being detected at operation 420. In this context, the communication state may be one of a connected state or a disconnected state. The method may further include initiating a state inference operation based on the indication of vehicle speed and detection of the shutdown transition at operation 430. Notably, the shutdown transition referred to in operation 400 to 430 above is just one specific example of an event trigger transition that could be detected for state inference purposes in alternative embodiments. In this regard, in some cases, the event trigger transition may be a wake transition (e.g., on a voltage rise instead of drop) which may initiate a wake function based on a state inference. Moreover, one of skill in the art may appreciate that other event trigger transitions associated with different voltage changes that correspond to different functions may also be employed for making state inferences or other functions.

A vehicle control system for a vehicle may therefore be provided. The method discussed above may, in some cases, be performed by the vehicle control system. Thus, for example, the system may be configured or programmed to perform the method. The vehicle control system may include a first electromechanical brake module operably coupled to first wheel-end brakes of a first wheel, a second electromechanical brake module operably coupled to second wheel-end brakes of a second wheel, a speed sensor for determining vehicle speed, and a communication monitoring module operably coupled to at least one of the first and second electromechanical brake modules to determine a communication state of the at least one of the first and second electromechanical brake modules. The communication state may be one of a connected state or a disconnected state. The communication monitoring module may also be operably coupled to the speed sensor. The communication monitoring module may receive an indication of vehicle voltage supply to determine whether an event trigger transition is detected, and initiate a state inference operation based on the vehicle speed and responsive to detecting the event trigger transition.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the state inference operation may infer a vehicle state for the vehicle responsive to vehicle speed being below a threshold speed and at the least one of the first or second electromechanical brake modules being determined to be in the disconnected state. In an example embodiment, the event trigger transition may be a shutdown transition that may include a change in the vehicle voltage supply from a first voltage to a second voltage, where the first voltage is a threshold voltage higher than the second voltage. In some cases, the threshold voltage may be about 2 V such as, for example, when the first voltage is about 14 V and the second voltage is about 12 V. In an example embodiment, the state inference operation may determine a parked state responsive to the vehicle speed being below the threshold speed within a predetermined time of the detecting the shutdown transition. In some cases, responsive to determining the parked state, the communication monitoring module may direct (e.g., instruct directly or indirectly) each of the first and second wheel-end brakes to apply a boosted brake force to the first and second wheels, respectively. In an example embodiment, the communication monitoring module may further be configured to filter the vehicle voltage supply measured over time to eliminate transient load effects with respect to the detecting the event trigger transition. In some cases, the communication state may be determined based on responsiveness of each of the first and second electromechanical brake modules to signaling on Ethernet or a CAN bus of the vehicle. In an example embodiment, an instance of the communication monitoring module may be located at each of the first and second electromechanical brake modules. In such a cases, the instance of the communication module located at each respective one of the first and second electromechanical brake modules may execute initiates the state inference operation independent of each other. In other examples, the event trigger transition may be a wake transition indicated by a change in the vehicle voltage supply from a first voltage to a second voltage, where the first voltage is a threshold voltage lower than the second voltage. Thus, for example, the event trigger transition may be a wake transition or a shutdown transition indicated by a change in the vehicle voltage supply from a first voltage to a second voltage, where the first voltage is one of 12V or 14V in a 12V system or being one of 48V or 52V in a 48V system, or other voltages in other systems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A vehicle control system of a vehicle, the system comprising:
   a first electromechanical brake module operably coupled to first wheel-end brakes of a first wheel;
   a second electromechanical brake module operably coupled to second wheel-end brakes of a second wheel;
   a speed sensor for determining vehicle speed; and
   a communication monitoring module operably coupled to at least one of the first and second electromechanical brake modules to determine a communication state of the at least one of the first and second electromechanical brake modules, the communication state being one of a connected state or a disconnected state,
   wherein the communication monitoring module is further operably coupled to the speed sensor,
   wherein the communication monitoring module receives an indication of vehicle voltage supply to determine whether an event trigger transition is detected,
   wherein the communication monitoring module initiates a state inference operation based on the vehicle speed and responsive to detecting the event trigger transition,
   wherein the event trigger transition is a shutdown transition,
   wherein the state inference operation determines a parked state, and
   wherein responsive to determining the parked state, the communication monitoring module directs each of the first and second wheel-end brakes to apply a boosted brake force to the first and second wheels, respectively.

2. The vehicle control system of claim 1, wherein the state inference operation infers a vehicle state for the vehicle responsive to vehicle speed being below a threshold speed and at the least one of the first or second electromechanical brake modules being determined to be in the disconnected state.

3. The vehicle control system of claim 2, wherein the shutdown transition is indicated by a change in the vehicle voltage supply from a first voltage to a second voltage, the first voltage being a threshold voltage higher than the second voltage.

4. The vehicle control system of claim 3, wherein the threshold voltage is about 2 V.

5. The vehicle control system of claim 3, wherein the first voltage is about 14 V and the second voltage is about 12 V.

6. The vehicle control system of claim 3, wherein the parked state is determined responsive to the vehicle speed being below the threshold speed within a predetermined time of the detecting the shutdown transition.

7. The vehicle control system of claim 1, wherein the communication monitoring module filters the vehicle voltage supply measured over time to eliminate transient load effects with respect to the detecting the event trigger transition.

8. The vehicle control system of claim 1, wherein the communication state is determined based on responsiveness of each of the first and second electromechanical brake modules to signaling on Ethernet or a controller area network (CAN) bus of the vehicle.

9. The vehicle control system of claim 1, wherein an instance of the communication monitoring module is located at each of the first and second electromechanical brake modules, and wherein the instance of the communication module located at each respective one of the first and second electromechanical brake modules initiates the state inference operation independent of each other.

10. The vehicle control system of claim 1, wherein the event trigger transition is a wake transition indicated by a change in the vehicle voltage supply from a first voltage to a second voltage, the first voltage being a threshold voltage lower than the second voltage.

11. The vehicle control system of claim 1, wherein the event trigger transition is a wake transition or a shutdown transition indicated by a change in the vehicle voltage supply from a first voltage to a second voltage, the first voltage being one of 12V or 14V in a 12V system or being one of 48V or 52V in a 48V system.

12. A method of inferring a vehicle state for control of a vehicle component based on the vehicle state inference, the vehicle comprising a first electromechanical brake module operably coupled to first wheel-end brakes of a first wheel and a second electromechanical brake module operably coupled to second wheel-end brakes of a second wheel, the method comprising:
   receiving an indication of vehicle speed;
   receiving an indication of vehicle voltage supply to determine whether an event trigger transition is detected based on a change in the vehicle supply voltage;
   determining a communication state of at least one of the first and second electromechanical brake modules responsive to the event trigger transition being detected, the communication state being one of a connected state or a disconnected state; and
   initiating a state inference operation based on the indication of vehicle speed and detection of the event trigger transition,
   wherein the event trigger transition comprises a shutdown transition,
   wherein the state inference operation determines a parked state, and
   wherein responsive to determining the parked state, the communication monitoring module directs each of the first and second wheel-end brakes to apply a boosted brake force to the first and second wheels, respectively.

13. The method of claim 12, wherein the state inference operation infers a vehicle state for the vehicle responsive to the vehicle speed being below a threshold speed and at the least one of the first or second electromechanical brake modules being determined to be in the disconnected state.

14. The method of claim 13, wherein the shutdown transition is a change in the vehicle voltage supply from a first voltage to a second voltage, the first voltage being a threshold voltage higher than the second voltage.

15. The method of claim 14, wherein the parked state is determined responsive to the vehicle speed being below the threshold speed within a predetermined time of the detecting the shutdown transition.

16. The method of claim 12, further comprising filtering the vehicle voltage supply measured over time to eliminate transient load effects with respect to the detecting the event trigger transition.

17. The method of claim 12, wherein the communication state is determined based on responsiveness of each of the first and second electromechanical brake modules to signaling on Ethernet or a controller area network (CAN) bus of the vehicle.

18. The method of claim 12, wherein an instance of a communication monitoring module is located at each of the first and second electromechanical brake modules, and wherein the instance of the communication module located at each respective one of the first and second electromechanical brake modules initiates the state inference operation independent of each other.

* * * * *